(No Model.)
W. BOWKER.
HOOP SAWING MACHINE.
No. 348,149. Patented Aug. 24, 1886.
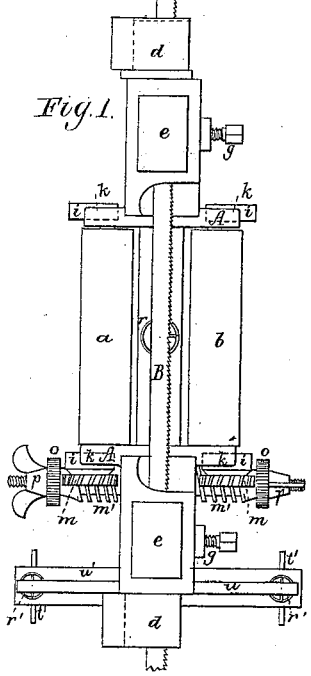
Fig. 1.
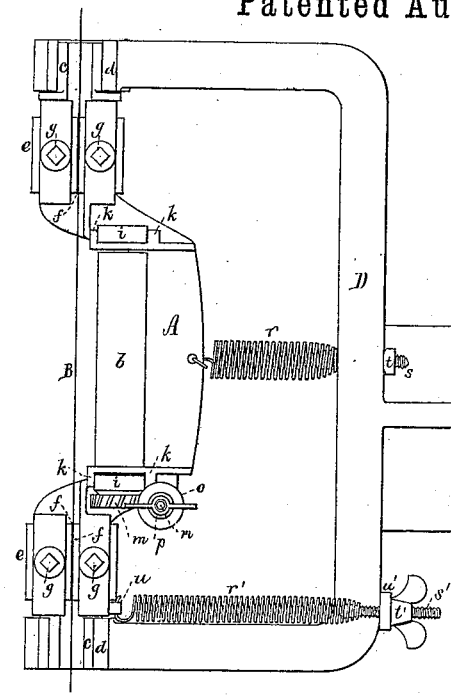
Fig. 2.
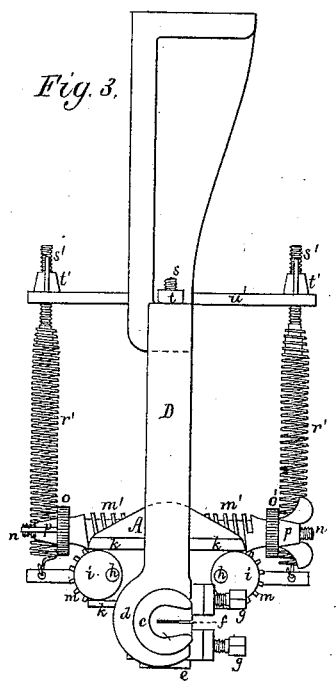
Fig. 3.
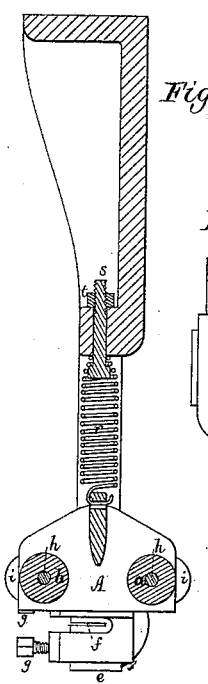
Fig. 5.
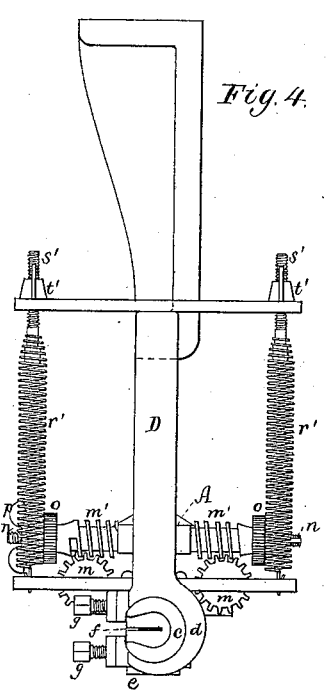
Fig. 4.
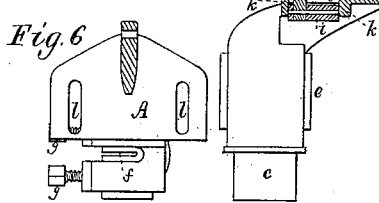
Fig. 7.
Fig. 6.
Witnesses:
S. N. Piper.
R. B. Torrey.
Inventor.
William Bowker,
by R. H. Eddy, att'y.
N. PETERS, Photo-Lithographer, Washington, D. C.

UNITED STATES PATENT OFFICE.

WILLIAM BOWKER, OF MEDFORD, ASSIGNOR TO THE BOWKER & WILLIAMS HOOP MACHINE COMPANY, OF BOSTON, MASSACHUSETTS.

HOOP-SAWING MACHINE.

SPECIFICATION forming part of Letters Patent No. 348,149, dated August 24, 1886.

Application filed May 14, 1886. Serial No. 202,167. (No model.)

*To all whom it may concern:*

Be it known that I, WILLIAM BOWKER, of Medford, in the county of Middlesex, of the Commonwealth of Massachusetts, have invented a new and useful Improvement in Machinery for Sawing Barrel-Hoops from Poles; and I do hereby declare the same to be described in the following specification, and represented in the accompanying drawings, of which—

Figure 1 is a front view, Fig. 2 a side elevation, Figs. 3 and 4 opposite end views, and Fig. 5 a transverse section, of mechanism embodying my invention, the nature of which is defined in the claims hereinafter presented. Fig. 6 is a transverse and median section of the rocker-frame as it appears without the rollers $a$ and $b$. Fig. 7 is a longitudinal section of one of the said rollers, its supporting-shaft, and its operative mechanism and the rocker-frame.

My said invention has reference to a hoop-pole-sawing machine, consisting of a band-saw and mechanism for guiding it lengthwise of it and bending it laterally in order to cause it to cut in a pole a kerf in parallelism with the median longitudinal line of the outer surface of the hoop or portion separated by such saw from the pole, such mechanism consisting of two rollers and their sustaining pivoted frame having grooved journals, and its supporting-carrier, a hoop-pole-sawing mechanism essentially of such character being represented in the United States Patents Nos. 259,661 and 272,996, granted to myself and Robert Williams.

In the accompanying drawings, $a$ and $b$ denote the pair of hoop-supporting rollers, and B the band-saw arranged with them in the usual manner. The rocker-frame in which the rollers are placed is shown at A, it having journals $c\ c$, which are tubular and open laterally, and are supported in bearings $d\ d$, of like character, of a bracket or carrier, D, all being as represented. Next to each of the journals of the rocker-frame there extends down through such rocker-frame, socketed to receive them, two wooden blocks, $e$, through a kerf or groove, $f$, in each of which the saw extends, and while in operation runs, such block being held in place by clamp-screws $g$, screwed into the frame and against the block. By having the blocks movable lengthwise of each in the frame they may be adjusted therein to properly support the saw, and when they may become too much worn they may be removed and others or fresh ones be substituted for them.

Each roller revolves on a shaft, $h$, that extends through it axially, such shaft at its ends being supported by two eccentrics, $i\ i$, in which it is fixed. Each eccentric extends between and has its circumference against two parallel guides, $k$. The shaft $h$ goes through straight slots $l$ made in the rocker-frame transversely thereof.

Fixed to one of the eccentrics of each roller is a worm-gear, $m$. These worm-gears engage with screws $m'$, revoluble on journals $n$, projecting from the frame A, each screw being provided with a milled head, $o$, for revolving it. Each journal $n$ is screw-threaded and has a set-nut, $p$, screwed upon it to work against the milled head to stop its screw from accidentally revolving. By turning either screw $m'$ on its journal the two eccentrics and their connecting-shaft may be simultaneously revolved, so as to move the roller nearer to or farther from the saw or its plane according to the thickness of the hoop to be removed by such saw from a pole.

In order that the rollers of the rocker-frame may properly adapt themselves to the longitudinal sinuosities of the external surface of the hoop while the pole is being sawed, a spiral spring, $r$, is at one end secured to the rocker-frame, and at the other to a screw-bolt, $s$, that goes through the carrier D and screws into a nut, $t$, arranged as represented. Instead of such single spring and its tension-adjusting screw and nut, I sometimes make use of two such springs, as shown at $r'\ r'$, each at its front end being fixed to a bar, $u$, which at its middle is fastened to the rocker-frame and extends in opposite directions therefrom, as represented. To each spring $r'$ at its rear part a screw-bolt, $s'$, is fixed and goes through another bar, $u'$, fixed to the carrier and arranged therewith, as shown. A nut, $t'$, placed beside and against the bar $u'$, is screwed on each screw-bolt $s'$.

The spring or springs, as described, operate to keep the rollers properly up to the hoop and to cause them to quickly accommodate themselves to the sinuosities thereof while the hoop-pole is being sawed. In some cases but one of the rollers *a b* is used, the other being removed or dispensed with.

I claim—

1. The combination, with the rocker-frame and its roller or rollers and carrier, and with the saw arranged therewith, as described, of one or more springs connecting such rocker-frame and carrier, substantially and for the purpose as set forth.

2. The combination, with the rocker-frame and its roller or rollers and carrier, and with the saw arranged therewith, as described, of the spring or springs connecting such rocker-frame and carrier, and having means of increasing or diminishing the tension of it or them, the said springs, substantially as set forth.

3. The combination, with the rocker-frame and each of its rollers, of the shaft $h$, the two eccentrics $i\ i$, fixed thereto, their parallel guides $k$, the worm-gear $m$, its operative screw $m'$, and its screw-threaded journal $n$ and set-nut $p$, all being substantially as described, and the roller-shaft being applied as represented to the said rocker-frame, the rocker-frame socketed, as represented, to receive the guide blocks of the saw and having screws for clamping each guide-block in its socket, as set forth.

WILLIAM BOWKER.

Witnesses:
R. H. EDDY,
R. B. TORREY.